(12) United States Patent
Cheng et al.

(10) Patent No.: US 7,657,731 B2
(45) Date of Patent: Feb. 2, 2010

(54) COMPUTER SYSTEM HAVING AN IDENTIFICATION DEVICE

(75) Inventors: Chih-Chuan Cheng, Taipei (TW); Chung-Chi Chien, Taipei (TW); Wen-Sung Tsai, Taipei (TW)

(73) Assignee: Compal Electronics, Inc., Nei-Hu District, Taipei (TW)

( * ) Notice: Subject to any disclaimer, the term of this patent is extended or adjusted under 35 U.S.C. 154(b) by 504 days.

(21) Appl. No.: 11/620,056

(22) Filed: Jan. 5, 2007

(65) Prior Publication Data

US 2007/0106891 A1 May 10, 2007

Related U.S. Application Data

(62) Division of application No. 10/708,903, filed on Mar. 31, 2004, now Pat. No. 7,350,064.

(30) Foreign Application Priority Data

Apr. 4, 2003 (TW) .............................. 92107819 A

(51) Int. Cl.
G06F 9/00 (2006.01)
G06F 9/24 (2006.01)
G06F 15/177 (2006.01)

(52) U.S. Cl. ......................................................... 713/1
(58) Field of Classification Search ...................... 713/1
See application file for complete search history.

(56) References Cited

U.S. PATENT DOCUMENTS

| 5,317,309 | A | 5/1994 | Vercellotti et al. |
| 5,870,086 | A | 2/1999 | Bang |
| 6,651,178 | B1 * | 11/2003 | Voegeli et al. ............... 713/300 |
| 6,686,830 | B1 | 2/2004 | Schirtzer |
| 6,944,425 | B2 | 9/2005 | Fallenstein |
| 6,988,211 | B2 * | 1/2006 | Cline et al. ................... 713/300 |

FOREIGN PATENT DOCUMENTS

| CN | 2469502 Y | 1/2002 |
| TW | 424175 | 3/2001 |
| TW | 485283 | 5/2002 |

* cited by examiner

Primary Examiner—Thomas Lee
Assistant Examiner—Mohammed H Rehman
(74) Attorney, Agent, or Firm—Winston Hsu

(57) ABSTRACT

A computer system includes an identification device and a host. The identification device includes a first wireless module for receiving a radio identification signal and then emitting a radio user signal with an identification code. The host includes a processing module for controlling operation of the host, a second wireless module for emitting the radio identified signal and receiving the user signal, a power supply for supplying power to the processing module while receiving a power control signal, and a control module electrically connected to the power supply. Before the power supply supplies power to the processing module, the control module checks whether the identification code within the user signal matches a predetermined identification code as the second wireless module receives the user signal. If the identification code within the user signal matches the predetermined identification code, the control module can transmit the power control signal to the power supply.

18 Claims, 3 Drawing Sheets

COMPUTER SYSTEM HAVING AN IDENTIFICATION DEVICE

CROSS REFERENCE TO RELATED APPLICATIONS

This is a division of U.S. patent application Ser. No. 10/708,903 filed on Mar. 31, 2004 and claims the benefit of priority of Taiwan application number 092107819 filed on Apr. 4, 2003, now Taiwan Patent No. 1238936 issued Sep. 1, 2005.

BACKGROUND OF THE INVENTION

1. Field of the Invention

The present invention relates to a computer system, and more specifically, to a computer system having a controllable host based on a user signal emitted by an identification device.

2. Description of the Prior Art

Due to advances in computer technology, a computer system is used to quickly swap and process various graphical, text data information, and enhance the effectiveness and enjoyment of work and life. Recently, the operating speed of the computer has increased along with the development of the central processing unit (CPU). As the operating speed of the CPU surpasses the frequency of a giga-hertz (GHz), the amount of data that the CPU can handle also increases significantly. The amount of data that the CPU is capable of processing per second is also substantially increasing as the power consumption is also going up. Therefore, various ways, such as monitoring the status of the display, monitoring the operation of the hard disk, and entering a sleep mode when the computer is idle for a default period, for reducing power consumption or for making the battery running longer are utilized. In a conventional computer, power consumption generated by the CPU takes a great part of the whole computer. As a result, the way in which the CPU is operated at lower frequencies when the user does not manipulate the computer is a usual strategy for power saving.

Additionally, users almost always run their computers for a long time. Sometimes users may temporarily logout or lock their computer to keep the computer from being used because in some condition users have to temporarily leave. In this way, users have to manually change, which causes more trouble.

Please refer to FIG. 1, which shows a functional block diagram of a computer system 10 according to the prior art. The computer system 10 comprises a CPU 12, a north bridge (NB) chipset 14, a south bridge (SB) chipset 16, a volatile memory 18, a basic input output system 20, a power supply 22, a display device 24, an input interface 26, a hard disk drive (HDD) 28, and a bus 30.

The CPU 12 is used for executing the operations of the computer system 10 to implement the integrated functions of the computer system 10. The north bridge chipset 14 is electrically connected to the CPU 12 for handling the data exchange between the CPU 12, and the memory 18 as a DRAM. The display device 24 is used for providing a visual image output of the computer system 10. The south bridge chipset 16, electrically connected to the north bridge chipset 14, is used for data-exchanging with the CPU 12 by way of the north bridge chipset 14, for example, data-exchange between the input interface 26, the HDD 28 and the CPU 12. The bus 30 is used as a connection path among the south bridge chipset 16, the HDD 28, the BIOS 20, the input interface 26 and other peripheral devices. The power supply 22 is used for supplying required power to the elements of the computer system 10 such as the north bridge chipset 16, the CPU 12, and so on (for clarity, only a connection between the power supply 22 and the CPU 12 is shown in FIG. 1). The HDD 28 is used for storing an operating system (OS) 32 and application program 34. The input interface 26 includes a keyboard, a mouse, and so on.

While the computer system 10 starts running, the power supply device 22 starts supplying power to the north bridge chipset 14, the south bridge chipset 16, the CPU 12, the HDD 28, and memory 18. Later on, the BIOS 20 is loaded into the memory 18 and implements a power on self test (POST) procedure, and the OS 32 stored in the HDD 28 is then loaded to the memory 18. Before performing the application program 34 stored in the HDD 28, the CPU 12 will generate a command to access data on the HDD 28. The data from the HDD 28 will then be transmitted through the south bridge chipset 16 to the north bridge chipset 14. Afterwards, the north bridge chipset 14 transmits the data from the HDD 28 to the memory 18 for storage. Thus, the CPU 12 can access the data from the HDD 28 in the memory 18 through the north bridge chipset 14 and temporarily store the data in flash memory of the CPU 12 (not shown) for carrying on the additional operations.

When users stop inputting any data for a default period, the display device 24 of the computer system 10 will enter a save power mode. If the user's eyesight does not move from the display device 24, and just stop inputting data for such default period, the computer system 10 will also enter save power mode, causing the user's work to be interrupted. Generally speaking, most ways of setting the save power mode is managed by a power management program which is implemented by the BIOS 20 or the OS 32.

According to the advanced configuration and power interface (ACPI), the devices connected to an integrated device electronics (IDE) have to response to the computer system 10 based on its operating modes such as an idle mode, a standby mode, or a sleep mode. Therefore, if intending to re-enable the computer system 10, triggering the input interface 26 is necessary. If the user has to focus on the display device 24 without any input for a long time, he should turn off the function for saving mode, lest sudden interruption of his work. However, short default period arrangement results in frequently switching to the save mode, but a long default period arrangement results in a worse save power effect.

SUMMARY OF THE INVENTION

It is therefore a primary objective of the claimed invention to provide a computer system comprising an identification device and a host. The host is capable of detecting a radio user signal broadcasted by the identification device to control its operation for power saving, to solve the aforementioned problem.

According to the claimed invention, a computer system includes an identification device and a host. The identification device includes a first wireless module for receiving a radio identification signal and then emitting a radio user signal with an identification code. The host includes a processing module for controlling operation of the host, a second wireless module for emitting the radio identified signal and for receiving the user signal, a power supply for supplying power to the processing module while receiving a power control signal, and a control module electrically connected to the power supply. Before the power supply supplies power to the processing module, the control module is capable of checking whether the identification code within the user signal matches a predetermined identification code as the second wireless module receives the user signal. If the identification code within the user signal matches the predetermined identification code, the control module is capable of transmitting the power control signal to the power supply.

Another objective of the claimed invention is to provide a computer system having an identification device and a host. The identification device includes a first wireless module for receiving a radio identification signal and then emitting a radio user signal with an identification code. The host includes an input interface, a second wireless module, a control module, and a processing module. The input interface is used for generating an input signal. The second wireless module is used for receiving the radio user signal. The control module is used for providing an access control signal when no user signal is received by the second wireless module, and for checking whether the identification code within the user signal matches a predetermined identification code as the second wireless module receives the user signal. If the identification code within the user signal matches the predetermined identification code, the control module is capable of generating an access allowable signal. The processing module is used for performing an application program for controlling the operation of the computer system based on the input signal provided by the input interface. While performing the application program, if the access control signal is received, the processing module stops the input interface to control the status of the application program based on the input signal from the input interface. If the processing module receives the access allowable signal from the control module, the processing module recovers the input interface to control the status of the application program based on the input signal from the input interface.

Another objective of the claimed invention is to provide a computer system having an identification device and a host. The identification device includes a first wireless module for receiving a radio identification signal and then emitting a radio user signal with an identification code. The host includes a second wireless module and a processing module. The second wireless module is used for receiving the radio user signal. The processing module is used for performing an access subprogram for controlling the operation of the computer system. When performing the access subprogram, the processing module is capable of checking whether the identification code of the radio user signal received by the second wireless module matches a predetermined identification code. If the identification code matches the predetermined identification code, the processing module continues to perform an application program corresponding to the access subprogram. If not, the processing module stops performing the application program.

It is an advantage of the claimed invention that the required power is supplied by the power supply after detecting the user signal.

It is a further advantage of the claimed invention that controlling the host of the computer system for saving power is performed by detecting the user signal.

It is a further advantage of the claimed invention that controlling the application program executed by the host is performed by detecting the user signal.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
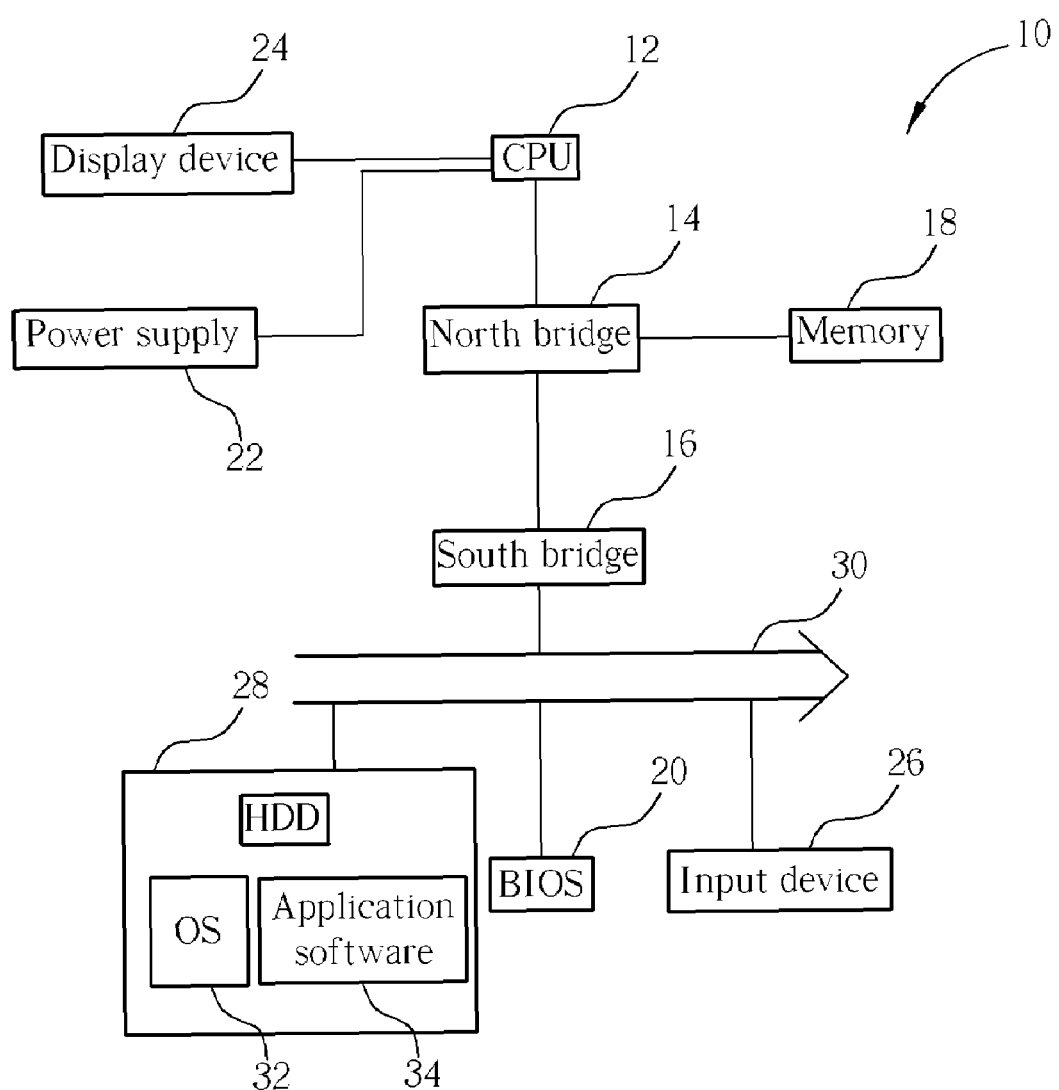
FIG. 1 is a functional block diagram of a computer system according to the prior art.
Figure 2:
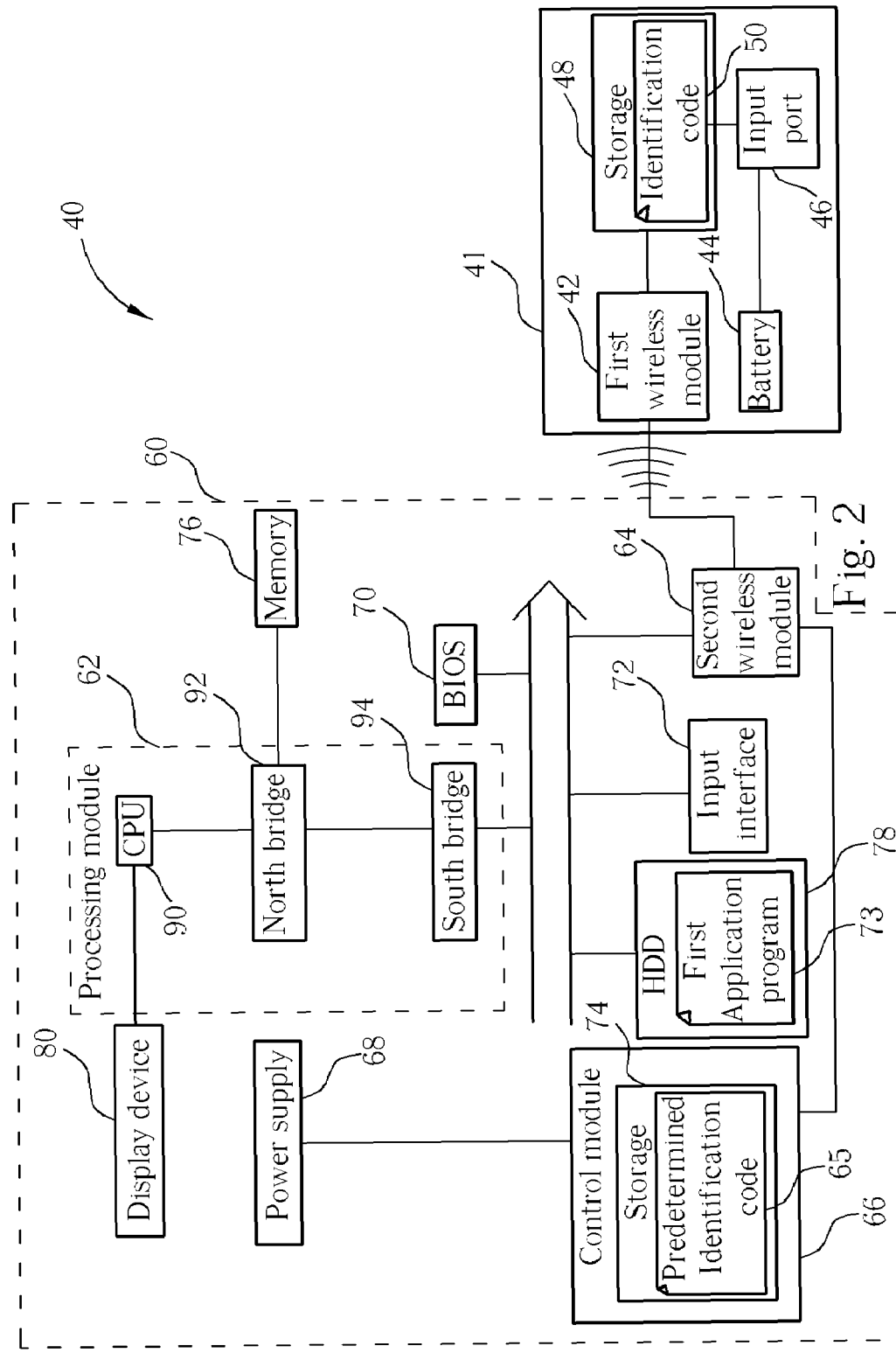
FIG. 2 is a block diagram of a computer system according to the present invention.

Please refer to FIG. 2, which is a block diagram of a computer system 40 according to the present invention. The computer system 40 comprises an identification device 41 and a host 60. The identification device 41 comprises a first wireless module 42 for receiving, a battery 44, an input port 46 and a storage device 48.

The first wireless module 42 is used for receiving a radio identification signal and thus for emitting a radio user signal which contains an identification code 50. The battery 44 supplies power for the identification device 41. The input port 46 is used for receiving electrical data signals. The storage device 48 is used for storing the received electrical data signals.

The host 60 comprises a processing module 62, a second wireless module 64, a control module 66, a power supply 68, a basic input output system (BIOS) 70, an input interface 72, a memory 76, a hard disk drive (HDD) 78 and a display device 80.

The processing module 62 is used for controlling the operation of the host 60. The processing module 62 comprises a central processor unit (CPU) 90, a north bridge chipset 92 and a south bridge chipset 94. The CPU 90 is used for integrating the operation of the host 60 of the computer system 40. The north bridge chipset 92, electrically connected to the CPU 90, is used to deal data exchange between the CPU 90 and the memory 76. The south bridge chipset 94, electrically connected with the north bridge chipset 92, is used for data exchanging with the CPU 90 by way of the north bridge chipset 92. The second wireless module 64 is used for emitting the radio identification signal, and receiving the radio user signal. The power supply 68 is used to supply power to the processing module 62, after receiving a power control signal, so that the processing module 62 can start functioning. The control module 66, electrically connected with the power supply 68, comprises a storage device 74 which is used for storing a predetermined code 65. The input interface 72 is used for generating an input signal based on the user's command. The memory 76 is used for temporarily storing data and program, the HDD 78 is used for storing data and programs. In the preferred embodiment, the identification device 41 can be made to be very light, so that the user can carry it around easily.

When the host 60 is power-off, the second wireless module 64 will emit the radio identification signal in a period of time. After receiving the radio identification signal, the identification device 41 will send an identification code 50 stored in the storage device 48 to the first wireless module 42 for encoding it into a user signal. Finally, the encoded user signal is emitted by the first wireless module 42. After detecting the emitted user signal, the second wireless module 64 of the host 60 decodes the user signal to the identification code 50 and sends it to the control module 66. Then, the control module 66 will compare the identification code 50 with a predetermined identification code 65 stored in the storage device 74. If the identification code 50 matches the predetermined identification code 65, the control module 66 generates a power control signal and then sends the power control signal to the power supply 68.

After receiving the power control signal, the power supply 48 starts providing power to the processing module 62, so that the processing module 62 can start functioning.

In other words, when the host 60 is powered-off and the user who carries the identification device 41 gets close to the host 60, the first wireless module 42 of the identification device 41 and the second wireless module 64 of the host 60 automatically establish a wireless connection, which is capable of identifying whether the owner of the identification device 41 is an authorized user for the host 60 by checking whether the identification code 50 and the predetermined identification code 65 are matched.

In this way, one who wants to use the host 60 only carries the identification device 41 close to the host 60, if the identification code 50 and the predetermined code 65 are matched, the control module 66 automatically powers-on the host 60. The user does not manually input identification code any more.

Please keep on referring to FIG. 2. When the power supply 68 starts applying power to the processing module 62, other devices such as the memory 76, the input interface 72, and the display device 80 are also switched on. The BIOS 70 will execute a power on self test (POST) for testing the memory 76 and the processing module 62, and then for loading an operating system (OS) stored in the HDD 78 into the memory 76 after finishing booting procedure. Afterwards, a first application program 73 stored in the HDD 78 can be opened and executed. The user can manipulate the first application program 73 by means of the input interface 72.

After boot up, the first wireless module 42 of the identification device 41 still encodes the identification code 50 within the storage device 48 into a user signal, and emits the user signal in a predetermined period. At this moment, the second wireless module 64 of the host 60 keeps on detecting the user signal. If the second wireless module 64 does not detect the user signal, the control module 66 generates an access control signal to the processing module 62. After receiving the access control signal, the operational status of the first application program 73 fails to be manipulated by the input interface 72. When the second wireless module 64 detects the emitted user signal, the user signal is decoded to the identification code 50. If the identification code 50 and the predetermined code 65 are matched, the control module 66 generates an access permission signal to the processing module 62. After receiving access permission signal, the status of the first application program 73 can be manipulated again by the input interface 72. For example, when the user temporarily carries the identification device 41 away from the host 60, the second wireless module 64 can not detect the user signal, so that the control module 66 sends the access control signal to the process module 62, causing the host 60 to be locked and the input interface 72 to fail to manipulating the first application program 73. After that, others are not allowed to unlock the host 60 by using the input interface 72 because other identification codes are not matched with the predetermined identification code 65. Therefore, the input interface 72 fails to recover manipulation for the first application program 73. When the second wireless module 64 detects the user signal, and the identification code 50 and the predetermined identification code 65 are matched, the host 60 will unlock. At this moment, the input interface 72 takes over the manipulation for the first application program 73.

In other words, when the user takes the identification device 41 away, the host 60 can switch its operation mode based on whether the user signal of the identification device 41 is received. The host 60 not only automatically enters the power save mode (like suspend to ram or suspend to disk), but also the lock status, which causes others that are non-authorized to fail to use the host 60. When the user with the identification device 41 gets close to the host 60, the host 60 can automatically switch back to normal mode, so that the user with the identification device 41 can keep on working by means of the host 60.

Figure 3:
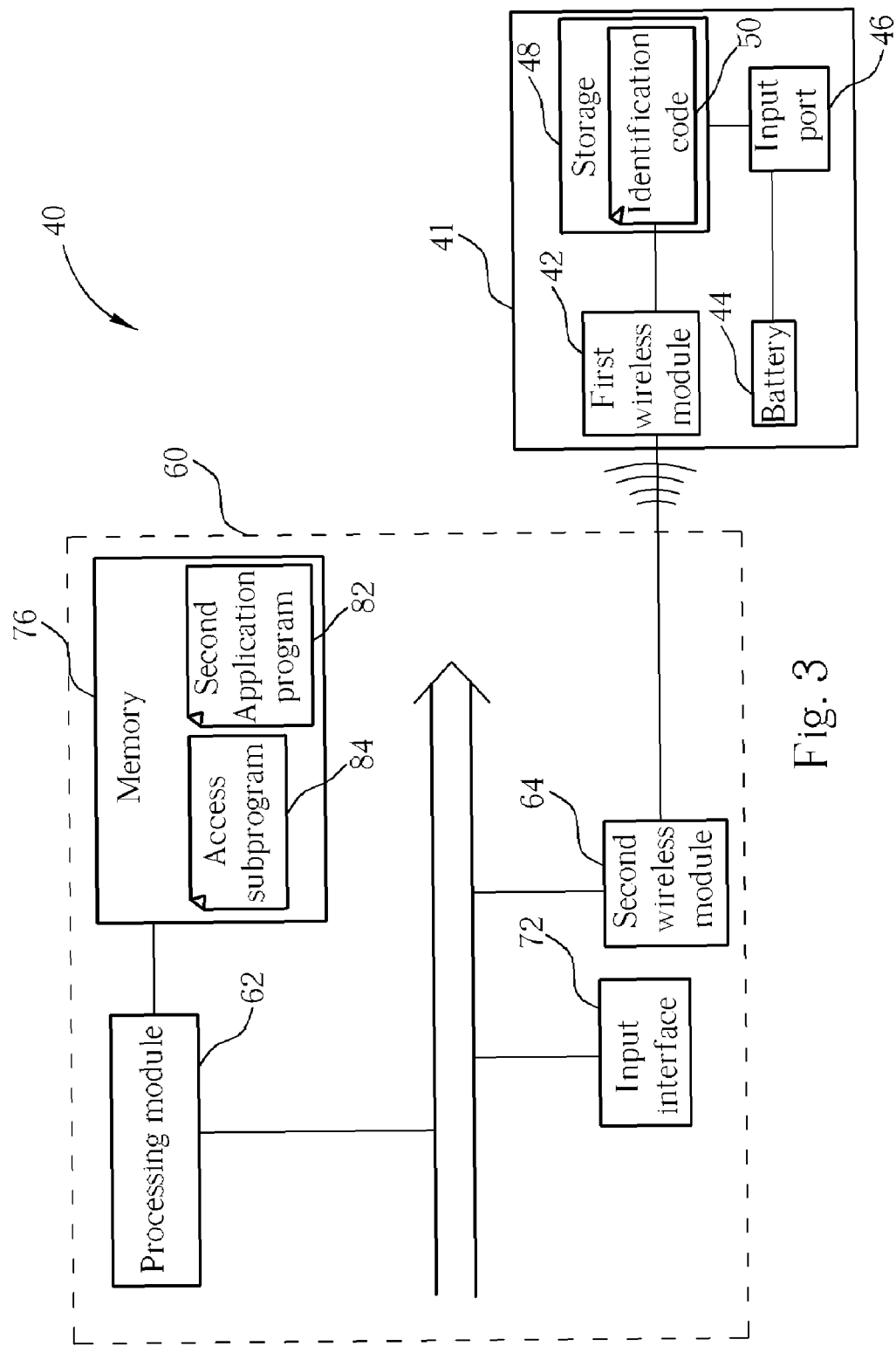
FIG. 3 is a block diagram of another preferred embodiment computer system according to the present invention.

Please refer to FIG. 3. FIG. 3 is another preferred embodiment according to the present invention. For simplicity, elements that have the same function as that illustrated in FIG. 2 are provided the same item numbers used in FIG. 3.

While executed a second application program 82, an access subprogram is executed for ensuring the identification of the user, and the user has to input associated information for verifying his identity. To do so, the processing module 62 can compare the received identification code 50 and the predetermined code 65. If both of them are matched, the processing module 62 starts to perform the second application program 82. If not, the second application program 82 is suspended. For example, suppose the user intends to run the second application program 82 (like a web browser) to do online trading. An API access subprogram (such as a login program) 84 is performed prior to the second application program 82 for identifying an account and a password for the login user. In the meanwhile, while the access subprogram 84 is run, the processing module 62 sends a request signal via the second wireless module 64. After receiving the request signal, the identification device 41 encodes the identification code 50 into a user signal and then sends it back via the first wireless module 42. Afterwards, the second wireless module 64 receives the user signal and sends it to the processing module 62. The process module 62 can compare the identification code 50 from the first wireless module 42 and the predetermined identification code 65. If both are matched, that means identification and authorization for the user are confirmed. In this way, the second application program 82 is capable of being executed subsequent to the access subprogram 84.

Please notice that the preferred embodiment identification device 41 can store various identification codes corresponding to different application programs in the storage device 48. For example, if the user has different user IDs and passwords for different websites, the identification device of this embodiment can function. In other words, the identification device 41 can store or automatically provide identification codes for controlling power-on, lock and unlock status for the host 60, and for identifying user's authorization for various application programs, such as accounts in various banks and corresponding passwords. The user does not remember many accounts or passwords with complex digits or texts, preventing the user from forgetting those accounts or passwords, or from leaking them out as they are keyed in.

To sum up, the present invention techniques for memorizing and automatically providing required identification data is described as follow. In the illustrative embodiment, the processing module 62 can execute a driver cooperating with the control module 66, which is used for watching execution of each application program in the processing module 62. For example, when a user uses a web browser to read a website in need of examining identification for the login user, an access program is performed prior to reading the website for keying in associated identification data, such as his personal ID and a password.

While detecting the execution of the access subprogram, the process module 62 automatically keys in identification material. For the present browser, when the user login the website for the first time, the browser could query the user if the user wants the identification data to be memorized. Similarly, the present invention computer system can also ask the user if the user wants the identification data to be memorized in identification device 41 when the user keys in the first time. If the user agrees, the associated identification data (and associated data as to the website) are stored in the identification device 41 through the second wireless module 64 and the first wireless module 42. The next time the user needs to browse the same website, the identification data stored in the identification device 41 is capable of being automatically used for login through the second wireless module 64 and the first wireless module 42.

In the illustrative embodiment, the identification code 50 and the predetermined identification code 65 can be the ID for the identification device 41, or inputted password depending on user's desire. In addition, the user can modify the predetermined identification code 65 by means of the input interface 72, and wirelessly modify the identification code 50 through the second wireless device 64.

In other words, the user can change the predetermined identification code 65 stored in the host 60 as well as its corresponding identification code 50 stored in the identification device 41, to improve security. Besides, the storage device 48 of the identification device 41 can store radio signals from the first wireless module 42 or signals from the input port 46 in connection with the host 60. Therefore, the storage device 48 of the identification device 41 can not only store the identification code, but also personal desired data, no matter if these data are from the input port 46 in connection with the host 60 or from the first wireless module 42. In this way, the identification module 41 can not only be a personal unique identification tool, but also a personal memory tool that can be carry around. In addition, the input port 46 can be used as a plug for transmitting power for the identification device 41 or used to charge the battery 44.

Notice that the radio user signal emitted by the identification device 41 complies with Bluetooth communication protocol or 802.11x communication protocol.

Compared to prior art, the host of the computer system is capable of supplying required power to the host while detecting the radio user signal sent out by the identification device, and is also capable of controlling the operation of the host for power saving or for secret. In addition, detecting the identification code can replace the conventional way of logging in to a website manually, relieving users from memorizing many passwords.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A computer system comprising:
    an identification device comprising:
        a first wireless module for receiving a radio identification signal and then emitting a radio user signal with an identification code; and
        a memory for storing the identification code; and
    a host comprising:
        an input interface for generating an input signal;
        a second wireless module for receiving the radio user signal;
        a control module for providing an access control signal when no user signal is received by the second wireless module, and for checking whether the identification code within the user signal matches a predetermined identification code as the second wireless module receives the user signal; if the identification code within the user signal matches the predetermined identification code, the control module is capable of generating an access allowable signal; and
        a processing module for performing an application program for controlling the operation of the computer system based on the input signal provided by the input interface; while performing the application program, if receiving the access control signal, the processing module handles the application program according to the signal received from the input interface, if the processing module receives the access allowable signal from the control module, the processing module recovers the input interface to control the status of the application program based on the input signal from the input interface;
    wherein the first wireless module is also capable of generating a corresponding electrical data signal while receiving a radio data signal, and the memory is capable of storing the electrical data signal.

2. The computer system of claim 1 wherein the identification device comprises a battery for supplying power to the identification device.

3. The computer system of claim 1 wherein the identification device further comprises an input port for receiving an electrical data signal, and the memory is capable of storing the electrical data signal received by the input port.

4. The computer system of claim 3 wherein the input port is capable of being used to provide required power of the identification device or to charge the battery.

5. The computer system of claim 1 wherein the identification code is the ID of the identification device or a password.

6. The computer system of claim 1 wherein the predetermined identification code is capable of being modified through the use of the input interface, and the identification code stored in the identification device is capable of being modified in a wireless way via the second wireless module of the host.

7. The computer system of claim 1 wherein the identification device regularly emits the user signal via the first wireless module with a predetermined period, and the host receives the user signal via the second wireless module based on the predetermined period to determine the location of the identification device.

8. The computer system of claim 7 wherein the user signal emitted from the identification device complies with a bluetooth communication protocol.

9. The computer system of claim 7 wherein the user signal emitted from the identification device complies with an 802.11x communication protocol.

10. A computer system comprising:
    an identification device comprising:
        a first wireless module for receiving a radio identification signal and then emitting a radio user signal with an identification code; and
        a memory for storing the identification code; and
    a host comprising:
        a second wireless module for receiving the radio user signal; and a processing module for performing an access subprogram for controlling the operation of the computer system; when performing the access subprogram, the processing module is capable of checking whether the identification code of the radio user signal received by the second wireless module matches a predetermined identification code; if the identification code matches the predetermined identification code, the processing module continues to perform an application program corresponding to the access subprogram; if not, the processing module stops performing the application program;

wherein the first wireless module is also capable of generating a corresponding electrical data signal while receiving a radio data signal, and the memory is capable of storing the electrical data signal.

11. The computer system of claim 10 wherein the identification device comprises a battery for supplying power to the identification device.

12. The computer system of claim 10 wherein the identification device further comprises an input port for receiving an electrical data signal, and the memory is capable of storing the electrical data signal received by the input port.

13. The computer system of claim 12 wherein the input port is capable of being used to provide required power of the identification device or to charge the battery.

14. The computer system of claim 10 wherein the identification code is the ID of the identification device or a password.

15. The computer system of claim 10 wherein the host further comprises an input interface for receiving input data; the predetermined identification code is capable of being modified through the use of the input interface, and the identification code stored in the identification device is capable of being modified in a wireless way via the second wireless module of the host.

16. The computer system of claim 10 wherein the identification device regularly emits the user signal via the first wireless module with a predetermined period, and the host receives the user signal via the second wireless module based on the predetermined period to determine the location of the identification device.

17. The computer system of claim 16 wherein the user signal emitted from the identification device complies with a bluetooth communication protocol.

18. The computer system of claim 16 wherein the user signal emitted from the identification device complies with an 802.11x communication protocol.

* * * * *